US012591580B2

(12) United States Patent
Todd et al.

(10) Patent No.: US 12,591,580 B2
(45) Date of Patent: Mar. 31, 2026

(54) CONFIDENCE FABRIC ENHANCED PRIVACY-PRESERVING DATA AGGREGATION

(71) Applicant: Dell Products L.P., Round Rock, TX (US)

(72) Inventors: Stephen J. Todd, North Andover, MA (US); Pankaj Pande, Carlingford (AU)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/401,715

(22) Filed: Jan. 2, 2024

(65) Prior Publication Data

US 2025/0217370 A1 Jul. 3, 2025

(51) Int. Cl.
*G06F 17/00* (2019.01)
*G06F 7/00* (2006.01)
*G06F 16/2457* (2019.01)
*G06F 21/62* (2013.01)

(52) U.S. Cl.
CPC .... *G06F 16/24573* (2019.01); *G06F 21/6254* (2013.01)

(58) Field of Classification Search
CPC ...................... G06F 16/24573; G06F 21/6254

USPC .......................................................... 707/722
See application file for complete search history.

(56) References Cited

U.S. PATENT DOCUMENTS

| | | | | |
|---|---|---|---|---|
| 10,311,074 B1 * | 6/2019 | Beard | ............... | G06F 16/24578 |
| 2018/0067994 A1 * | 3/2018 | Lu | ........................... | G06F 16/957 |
| 2020/0327250 A1 * | 10/2020 | Wang | .................... | G06N 20/00 |
| 2021/0034382 A1 * | 2/2021 | Todd | ....................... | H04L 9/3247 |
| 2021/0037056 A1 * | 2/2021 | Todd | ......................... | H04L 9/50 |
| 2021/0117128 A1 * | 4/2021 | Todd | ........................ | G06F 3/067 |
| 2021/0124727 A1 * | 4/2021 | Todd | ................... | G06F 16/2237 |
| 2021/0124728 A1 * | 4/2021 | Todd | ................. | G06F 16/2365 |
| 2021/0243218 A1 * | 8/2021 | Todd | ........................ | H04L 9/50 |
| 2022/0156267 A1 * | 5/2022 | James | ................ | G06F 16/2455 |

* cited by examiner

*Primary Examiner* — Pavan Mamillapalli
(74) *Attorney, Agent, or Firm* — Workman Nydegger

(57) ABSTRACT

Enhancing privacy-preserving data aggregation with a data confidence fabric or confidence scores. Data points ingested into a data confidence fabric are associated with a confidence score. The confidence score is generated as trust insertion technologies are applied to the data points. The confidence score reflects a trustworthiness of the data and reflects how the data points are trusted. When aggregating the data points into aggregated data, the data points are aggregated in a manner that accounts for their confidence scores. This lessens the impact of data points that have comparatively low confidence scores in the aggregated data.

20 Claims, 5 Drawing Sheets

500

Storage Media
508

UI Device
510

Data Storage
512

Memory
502

NVRAM
504

Processor
506

Application(s)
514

CONFIDENCE FABRIC ENHANCED PRIVACY-PRESERVING DATA AGGREGATION

FIELD OF THE INVENTION

Embodiments of the present invention generally relate to data confidence fabrics. More particularly, at least some embodiments of the invention relate to systems, hardware, software, computer-readable media, and methods for data confidence based privacy-preserving data aggregation.

BACKGROUND

Computing and other electronic devices come in a variety of types and form factors and have varying capabilities. Many of these devices generate data that may be used by various applications. There is often a question, however, about the value of the data or how much the data should be trusted. The ability to trust data may depend on the manner in which the data is generated and subsequently transmitted to an application.

Data is often collected and aggregated for use by an application. One of the issues related to data collection and aggregation relates to privacy. When aggregating data, various techniques are employed to protect user privacy. Aspects of data privacy can include ensuring that unauthorized individuals or applications do not have access to personal information, determining who/what is able to access the information, or the like. Data privacy may also relate to operations that anonymize the data.

At the same time, applications benefit from using data that is reliable and valid. Using data whose source is unknown, unidentified or privatized in another manner may impact the usability of the data. For example, an application may be wary of trusting data whose source or authorship is unknown. In addition, applications are often unable to determine whether the data they use is good or suitable for its intended purpose.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
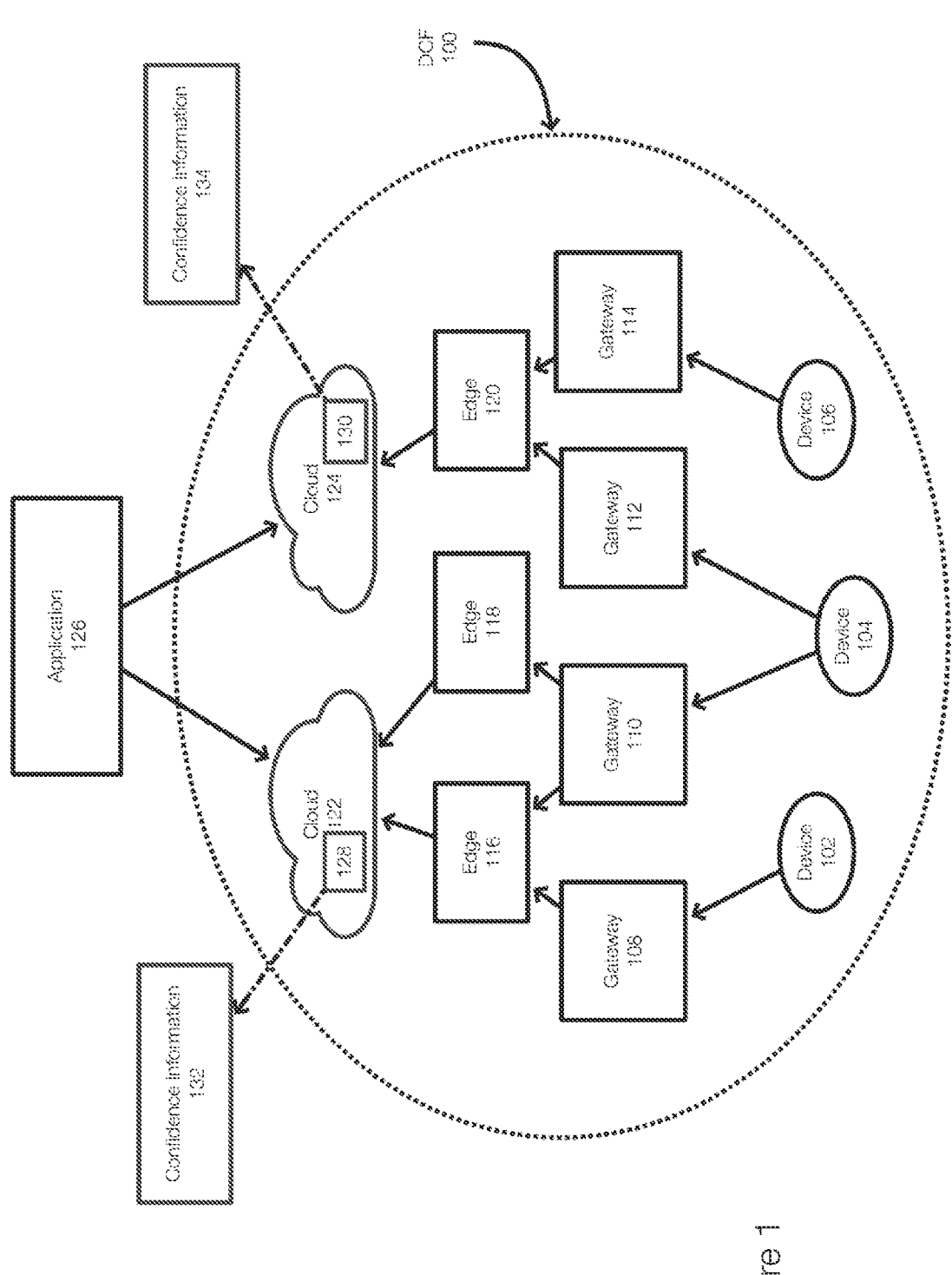
FIG. 1 discloses aspects of a data confidence fabric.

Embodiments of the present invention generally relate to computing systems or ecosystems such as data confidence fabrics (DCFs). In one example, a DCF is a system or network of hardware (computers, servers, routers, network interface cards, storage including immutable storage and/or other hardware) that is provisioned (e.g., with software, services) to score or rank data that may be ingested into and/or transmitted through the DCF. The data ingested into the DCF can be made available to applications, which may also be part of the DCF. The applications can leverage the confidence scores of the data.

A DCF can be implemented in various configurations. A DCF may exist in an edge system, in a cloud system, an on-premise system, or combinations thereof. A DCF is generally configured to add or associate confidence information to data. Confidence information can take various forms including a confidence score and associated metadata. The confidence information can be added, by way of example, from a hardware perspective and/or a software or application perspective.

A DCF, by way of example only, may be an architecture and set of services that allow data to be ingested and used by applications. The DCF may include trust insertion technologies (hardware and/or software) that are applied to the data or performed as the data flows through the DCF. Each time a trust insertion technology is applied to data, an annotation may be made in a ledger or other structure and the confidence score of the data may be changed or updated. Thus, the confidence score of data provides a view into the trustworthiness of the data to an application.

A DCF may include various interconnected hardware environments (e.g., nodes). These nodes may have varying hardware capabilities that are examples of trust insertion technologies or hardware-assisted trust insertion technologies. The hardware is configured such that, as data flows from data sources to storage or to applications in a DCF system, scores can be attached or associated with the data. As the data is handled or processed by various forms of trust insertion technologies, the overall score or ranking (e.g., a confidence score or trustworthiness score) of the data may change. The data scored or ranked in the DCF system may be stored in various locations, such as a data lake, in a datacenter, public cloud data storage service, or the like. The confidence information, which may include a confidence score or rank, is made available to one or more applications or other clients or users. The confidence information may include, in addition to a confidence score and/or rank, tables, audit information, and the like.

Confidence scores allow an application to explore or exploit the data for potential analysis or consumption. The confidence score or rank of the data allows an application to understand or account for the trustworthiness of the data. For example, the confidence score of the data may have an impact on whether the data is actually used by the application. An application may require a minimum confidence score or have other requirements related to the confidence score.

Embodiments of the invention, by way of example, provide a DCF system or configuration that provides or establishes trusted and auditable node connectivity within the DCF, and trusted and auditable interactions with other DCFs. A DCF is able to give or associate data with scores from individual trust insertion technologies. These scores can be combined in multiple ways to determine a final confidence score or rank that relates to the trustworthiness of the data. The confidence scores provided from a hardware perspective can be maintained separately from confidence scores from a software perspective. The confidence scores can also be combined into an overall confidence score.

Embodiments of the invention may relate to DCF systems in which data aggregation, including privacy-based data aggregation, is performed. Edge environments can be configured as DCF systems and, for example, may receive and process large volumes of data from a variety of sources. Privacy-preserving data aggregation techniques are often employed to ensure data privacy while maintaining data utility. Privacy-preserving aggregation mechanisms, on their own, do not provide information related to the reliability or trustworthiness of the data.

The loss of identifying or private information can potentially reduce or impact the reliability (or perceived reliability) of anonymized aggregated data. For example, a particular data source may be providing faulty, incorrect, incomplete, and/or malicious data. When this data is anonymized and aggregated together with data from other presumably reliable sources in this example, the overall usefulness, validity, and trustworthiness of the anonymized and aggregated data is reduced.

Embodiments of the invention relate to a DCF system that incorporates data confidence scores into the data privacy aggregation process. More specifically, embodiments of the invention relate to privacy-based aggregation operations that aggregate data using the data confidence scores of the data being aggregated. The confidence scores of the data (e.g., data points) allow contributions of the data to the aggregated data to be performed in a considered manner. For example, data points with lower confidence scores may be given a weight that is lower than data points with relatively higher confidence scores. Embodiments of the invention allow high-confidence data points to be prioritized or more heavily weighted in the aggregated data. This allows aggregated data with better utility to be generated without compromising user privacy. A data point may refer to data that is associated with a confidence score and may refer to a single datum, a set of data, a stream of data, or the like. Data points may also be referred to as data.

FIG. 1 illustrates an example of a data confidence fabric (DCF), a DCF system, or a DCF network. The DCF 100 may include various computing and hardware components, connections, and environments. The DCF 100 is configured to add confidence information including confidence scores to data or packets flowing in the DCF 100 or ingested into the DCF 100.

FIG. 1 illustrates examples of data routes or paths in the DCF 100. In FIG. 1, data generated by devices 102, 104, and 106 (data sources) may flow through multiple levels or multiple hardware environments such as gateways 108, 110, 112, and 114, edges 116, 118, 120, and clouds 122 and 124. In one example, the data generated by the devices 102, 104, and 106 may be stored in the clouds 122 and 124.

As the data 128 and the data 130 flow through the DCF 100, the DCF 100 may generate and/or add confidence information to the data. After flowing through the DCF 100, the data 128 (which may have been generated by one of the devices 102, 104, and/or 106) may be stored in the cloud 122 and made available to an application 126. Similarly, the data 130 may be made available to the application 126. The data 128 is associated with confidence information 132 and the data 130 is associated with confidence information 134. The confidence information 132 and 134 may include confidence scores, provenance data, audit trails/logs, data graphs, applied trust insertion technologies, or the like.

Data flowing through a DCF is typically more valuable and useful to an application at least because the confidence scores or ranks of DCF annotated data allow the application 126 to decide how or whether to trust and/or use the associated data. The DCF annotated data also allows aggregation operations to account for the trustworthiness of the data when aggregating the data (e.g., data points) that have been ingested into the DCF 100.

Figure 2:
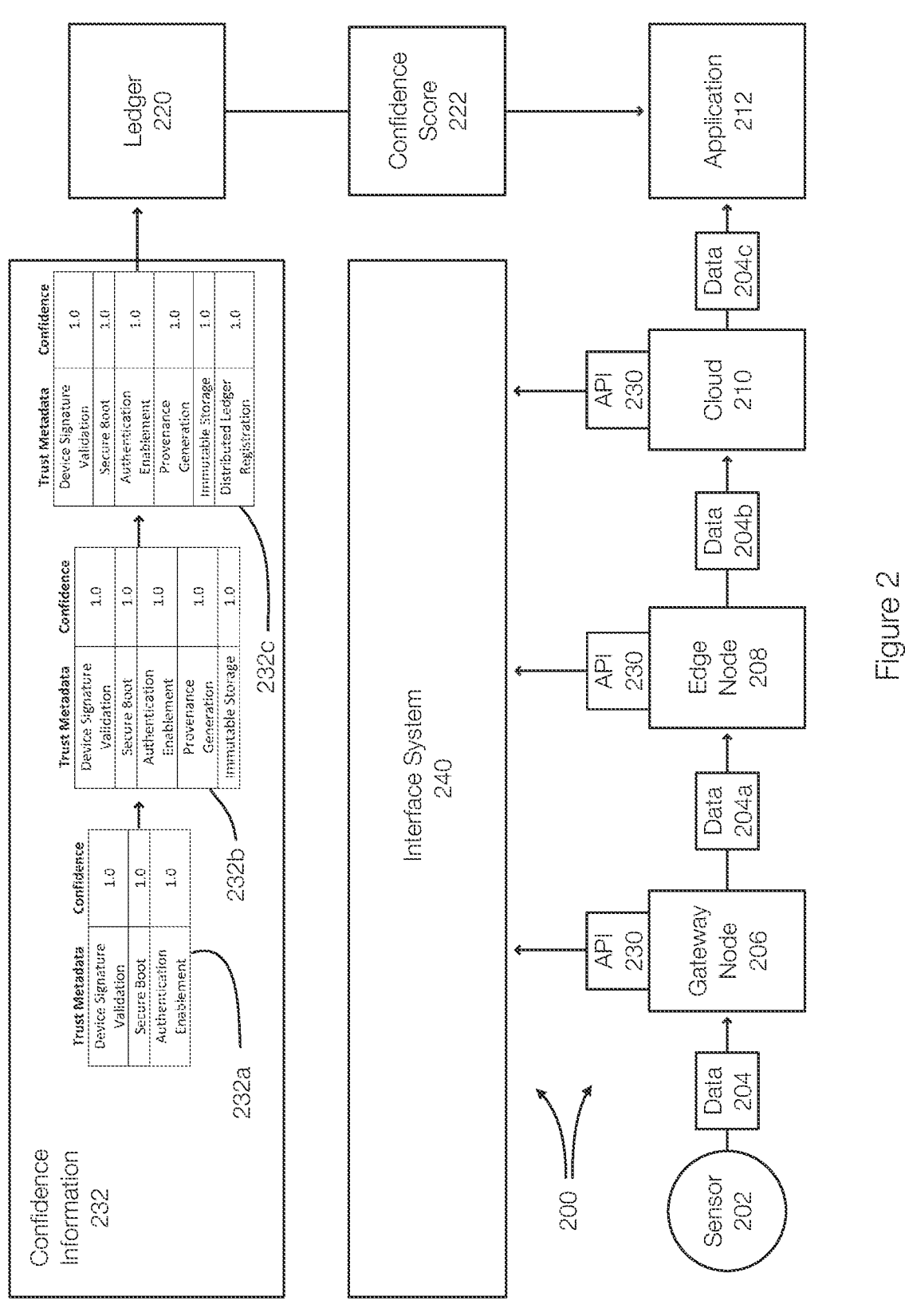
FIG. 2 discloses additional aspects of a data confidence fabric that is configured to perform or support confidence-based data aggregation.

FIG. 2 discloses additional aspects of a data confidence fabric network. FIG. 2 illustrates a DCF 200, which is an example of the DCF 100. In the DCF 200, data 204 is generated by a sensor 202 (or other devices such as user devices) and is ingested into the DCF 200. The data 204 may be received at a gateway node 206, which interfaces with an interface system 240 of the DCF 200 to annotate the data 204 with confidence information.

As illustrated in FIG. 2, confidence information 232 is generated and accompanies (or is associated with) the data 204 as the data 204 is routed in the DCF 200. At the gateway node 206, for example, the data 204 is annotated with confidence information 232a, which relates to trust insertion technologies such as a device signature validation, a secure boot, and an authentication enablement. Each of these trust insertion technologies, in this example, are performed and a confidence score is added to the confidence information 232 that is reflected in the confidence information 232a. More specifically, the gateway node 206 may access an interface system 240 using an application programming interface (API) 230 to record the confidence information 232a.

Next, the data 204a (which is the annotated data 204 after passing through the gateway node 206) is routed to an edge node 208 and additional confidence information is added as reflected in the confidence information 232b. Thus, the data 204a arrives at the edge node 208 and is already associated with the confidence information 232a. The edge node 208 may add or apply additional trust insertion technologies such as provenance generation and immutable storage. These trust insertion technologies allows the confidence information to be augmented as illustrated by the confidence information 232b. Thus, the data 204b leaving the edge node 208 is associated with the confidence information 232b.

Next, the data 204b arrives at the cloud 210 and additional confidence information is added as illustrated by the confidence information 232c. Thus, the cloud 210 may apply or use a trust insertion technology such as distributed ledger registration and the confidence information 232 is updated as shown by the confidence information 232c.

In one example, the confidence information 232 is stored in a ledger 220. As a result, the confidence information 232 is secure and can be accessed by an application 212. In this example, the data 204 arrives at the application 212 as the annotated data 204c, which is associated with the confidence information 232c and with a confidence score of, in this example, 6.0. The application 212 thus has insight into the trustworthiness of the data 204 generated at the sensor 202 and is able to evaluate the confidence information 232 in addition to just the confidence score.

The confidence score can be generated in different ways. The individual confidence scores of various trust insertion technologies may be weighted or be different. For example, the DCF 200 may be associated with a maximum confidence score (e.g., 10, 100, or other metric). Alternatively, a maximum confidence score may not be present. If the data 204 had followed a different route in the DCF 200, the confidence score may be different. For example, other nodes may have trust insertion technologies that could have increased the confidence score of the data 204. Different routes may also result in lower confidence scores.

Although FIGS. 1 and 2 illustrate examples of DCFs, a DCF can be implemented in various environments that may or may not include cloud components. For example, a retail environment or warehouse environment may implement a DCF locally. Further, a DCF may be implemented wholly within an edge environment. The same operations are performed as data is process and routed within the DCF regardless of physical implementation.

Embodiments of the invention relate to confidence-based or enhanced privacy-cognizant data aggregation. Privacy-based data aggregation can include various techniques. For example, data can be privatized or anonymized by removing personal identifiers. In some examples, the personal information may be replaced with a different representation to aid in protecting the data in an attempt to preserve utility. Other methods may include introducing noise to help prevent user-specific information from being obtained. More generally, data aggregation may include combining data, summarizing data, in a manner that ensures that individual contributions or personally identifiable data cannot be extracted. For example, summing, averaging and other statistical analyses enable or preserve data utility without sacrificing privacy.

In one example, the aggregation process may also be associated with a confidence score. The aggregated data may also be given a confidence score that is generated from the confidence scores of the data points contributing to the aggregated data. The aggregated confidence score may account for the manner in which the data points were weighted as the data points were aggregated. This may allow databases of aggregated data to be generated and associated with aggregated confidence scores or a single confidence score representing confidence in the aggregated data as a whole.

Figure 3:
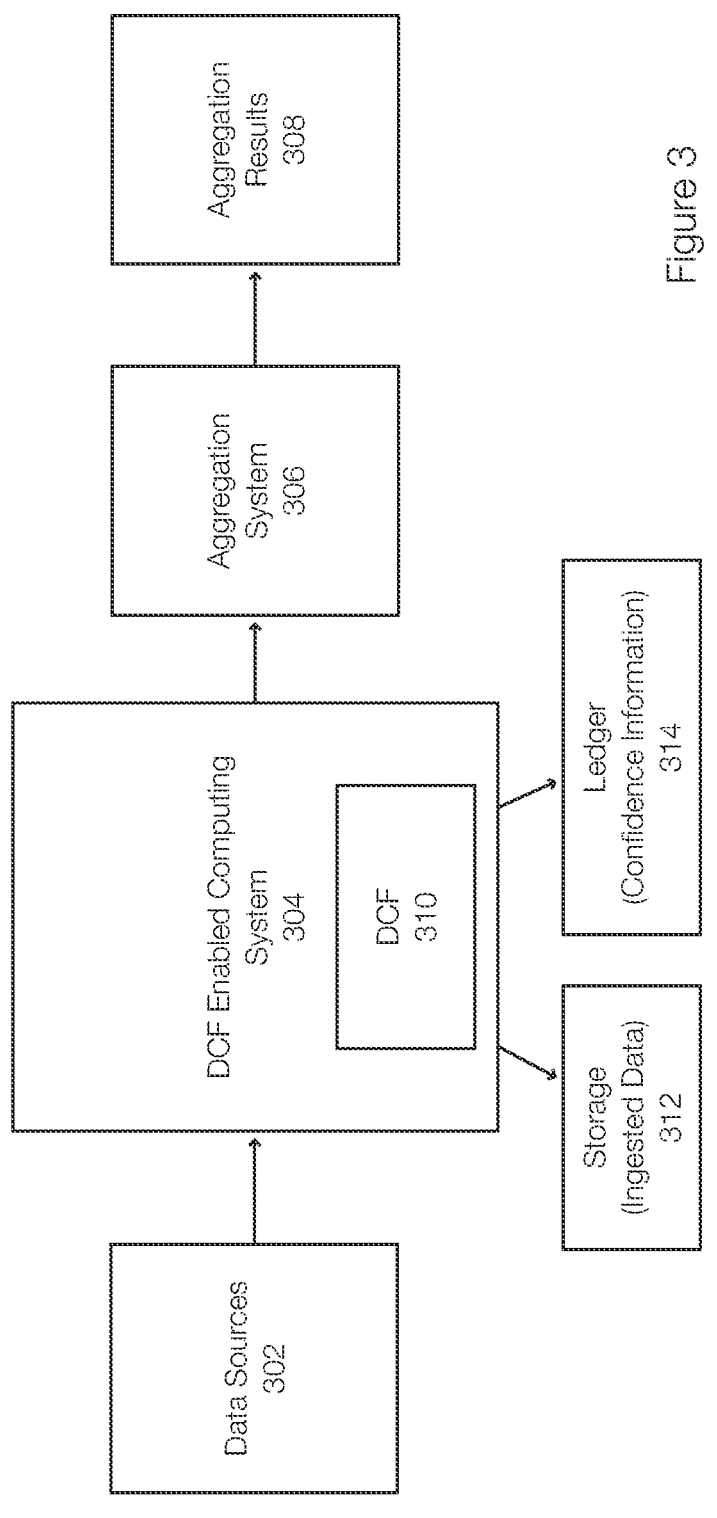
FIG. 3 discloses aspects of aggregating data using confidence scores in a manner that protects private or personal information.

FIG. 3 discloses aspects of DCF-enhanced privacy-preserving data aggregation. FIG. 3 illustrates data sources 302. The data sources 302 may generate data streams of various types (e.g., continuous, periodically, time-based, sampled, or the like). The data sources 302 may include IoT (Internet of Things) devices, sensors, user devices, or other input including user input. The data streams may also be referred to as or include data points that are each associated with a confidence score that is generated as the data points are ingested into the DCF.

The data generated by the data sources 302 is received into a computing system 304 that is DCF enabled. The DCF 310 (e.g., DCF 100, 200) may operate or be implemented in the computing system 304.

The computing system 304 may be an edge system. An edge system can take a variety of different forms. In one example, an edge system may refer to infrastructure that is closer to the edge or closer to the data sources 302. Being closer to the data sources 302 can reduce latency in the context of data transfer and response times. An edge system may also include infrastructure that is deployed geographically at multiple different locations. An edge system may also have substantial computing resources that allows data to be processed closer to the data sources 302. Edge systems can also be autonomous and decentralized. An edge system may include edge devices (e.g., the data sources 302), edge servers, and/or a cloud component. The edge servers, which are closer to the data sources 302, may perform various tasks such as analysis, aggregation, and the like.

In FIG. 3, the DCF enabled computing system 304 may be configured to generate and maintain confidence scores for all data or data streams received from the data sources 302. The confidence scores may account for data source reliability, accuracy, recency, other trust insertion technologies, or the like. The DCF 310 may store these confidence scores, as previously stated, in a ledger or other storage location such as a cloud based storage.

An aggregation system 306, which may be an example of an application, may be configured to generate aggregated data in a manner that preserves privacy. The aggregation system 306 may access the data ingested into the DCF enabled computing system 304 and stored in the storage 312 and/or the confidence scores (confidence information) stored in a ledger 314.

The aggregation system 306 may use the confidence scores in generating the aggregation results 308. More specifically, the aggregation system 306 may aggregate the data using, for example, differential privacy techniques, secure-multiparty computation techniques, statistical operations (e.g., summing, averaging, weighted summing/averaging) or the like.

As the aggregation operations are being performed, the confidence scores of the data (e.g., individual data points) may be used to aggregate the data in a weighted manner. For example, confidence scores may range from a value of 0 to 100. Confidence scores above a threshold confidence score, such as 80, may receive a first weight while data associated with confidence scores below the threshold may receive a lesser second weight in the aggregation operation.

Multiple and/or variable thresholds may be considered. For example, data with confidence scores below a qualifying threshold may be omitted from the aggregation process. A variable weight may simply give a weight that corresponds to the corresponding confidence score.

In another example, the aggregation system 306 may account for the use of the aggregation results 308 or the intended use. For applications that require very trustworthy data, the aggregated results 308 may only include contributions from data that exceeds a high confidence score (e.g., 90 in a scale of 0 to 100). Embodiments of the invention may also include other requirements related to specific trust insertion technologies. For example, the confidence score must be higher than a threshold confidence score and one or more specific trust insertion technologies must have been applied to the data.

The aggregated data may be stored in the storage 312 (or other storage) as aggregated results 308. The aggregated results 308 may have a corresponding aggregated confidence score in the ledger 314. The aggregation system 306 may also be viewed as a trust insertion technology such that different aggregation methods or applications may have different confidence scores themselves.

Aggregating data using the confidence scores generates aggregation results 308 that contain more valuable and accurate anonymized data that retains higher utility for analysis, decision-making, machine learning, and other purposes without violating user privacy.

For example, a location-based application in an edge environment may anonymously collect and aggregate user data to offer real-time traffic management and routing recommendations. The DCF-enhanced privacy preserving data aggregation ensures that only high-confidence data has a significant impact on the aggregated results. This may be achieved by weighting the data points contributing to the aggregated data. This allows the location based application to provide valuable and accurate traffic insights while maintaining user privacy.

Figure 4:
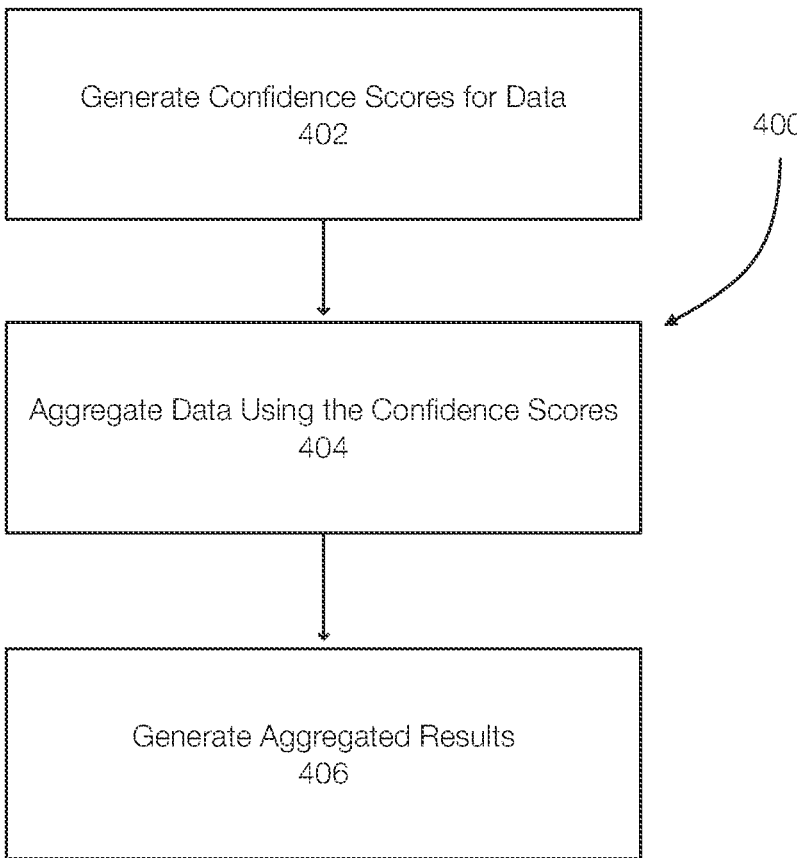
FIG. 4 discloses aspects of a method for aggregating data using confidence scores.

FIG. 4 discloses aspects of a method for confidence enhance privacy-based data aggregation. The method 400 includes generating 402 confidence scores for data ingested into a DCF system from multiple data sources. As the data is ingested, confidence scores for the data are generated and recorded. This occurs during normal operation of the DCF system.

The method 400 may also include aggregating 404 the data in a privacy preserving manner using the confidence scores. The confidence scores allows the contributions from the data to vary according to their associated confidence scores. In one example, and depending on how the confidence scores are used during the aggregation operations, only data points with a sufficiently high confidence score contribute to the aggregated data during the process of generating 406 the aggregated results. In another example, all relevant data may contribute to the aggregated data or results 308, but the impact of data points with higher confidence scores has more impact because more weight is given to those data points when generating 406 the aggregated results.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

In general, embodiments of the invention may be implemented in connection with systems, software, and components, that individually and/or collectively implement, and/or cause the implementation of, data network operations, routing operations, forwarding operations, confidence score determination operations, confidence information generation/storing operations, confidence based aggregation operations, privacy based aggregation operations or the like. More generally, the scope of the invention embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a data-center or other environment.

Example cloud computing environments, which may or may not be public, include environments that may provide services/functions for one or more clients. Another example of a cloud computing environment is one in which services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data system components such as databases, storage servers, storage volumes (LUNs), storage disks, servers, and the like, for example, may likewise take the form of software, physical machines, containers, or virtual machines (VMs), though no particular component implementation is required for any embodiment.

As used herein, the term 'data' is intended to be broad in scope. Thus, that term embraces, by way of example and not limitation, data produced in computing environments, by far edge nodes, sensors, user devices, or the like. Data may include time series data, data streams, sampled data, or the like and may have various formats and structures.

It is noted that any operation(s) of any of methods discloses herein may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: ingesting data points into a data confidence fabric implemented in a computing system, generating a confidence score for each data point ingested into the data confidence fabric, aggregating the data points into aggregated data, wherein the data points contribute to the aggregated data based on their corresponding confidence scores, and generating aggregated results that includes the aggregated data.

Embodiment 2. The method of embodiment 1, wherein the data points are generated by data sources and wherein the data points include personal information when generated.

Embodiment 3. The method of embodiment 1 and/or 2, further comprising weighting each of the data points according to their confidence scores.

Embodiment 4. The method of embodiment 1, 2, and/or 3, wherein data points with higher confidence scores are weighted more than data points with lower confidence scores.

Embodiment 5. The method of embodiment 1, 2, 3, and/or 4, further comprising setting a threshold confidence score, wherein data points having a confidence score lower than the threshold confidence score are not included in the aggregated data or are included with a first weight that is lower than a second weight given to data points having confidence scores higher than the threshold confidence score.

Embodiment 6. The method of embodiment 1, 2, 3, 4, and/or 5, further comprising anonymizing the data points when aggregating the data points.

Embodiment 7. The method of embodiment 1, 2, 3, 4, 5, and/or 6, further comprising anonymizing the data points using differential privacy or secure multi-party computation techniques or statistical methods.

Embodiment 8. The method of embodiment 1, 2, 3, 4, 5, 6, and/or 7, further comprising providing the aggregated results to an application, wherein the application is one of an analysis application, a decision making application, or a machine learning model and executing the application.

Embodiment 9. The method of embodiment 1, 2, 3, 4, 5, 6, 7, and/or 8, further comprising storing the confidence scores in a ledger.

Embodiment 10. The method of embodiment 1, 2, 3, 4, 5, 6, 7, 8, and/or 9, further comprising associating the aggregated results with an aggregated confidence score.

Embodiment 11 A system, comprising hardware and/or software, operable to perform any of the operations, methods, or processes, or any portion of any of these, disclosed herein.

Embodiment 12 A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, client, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
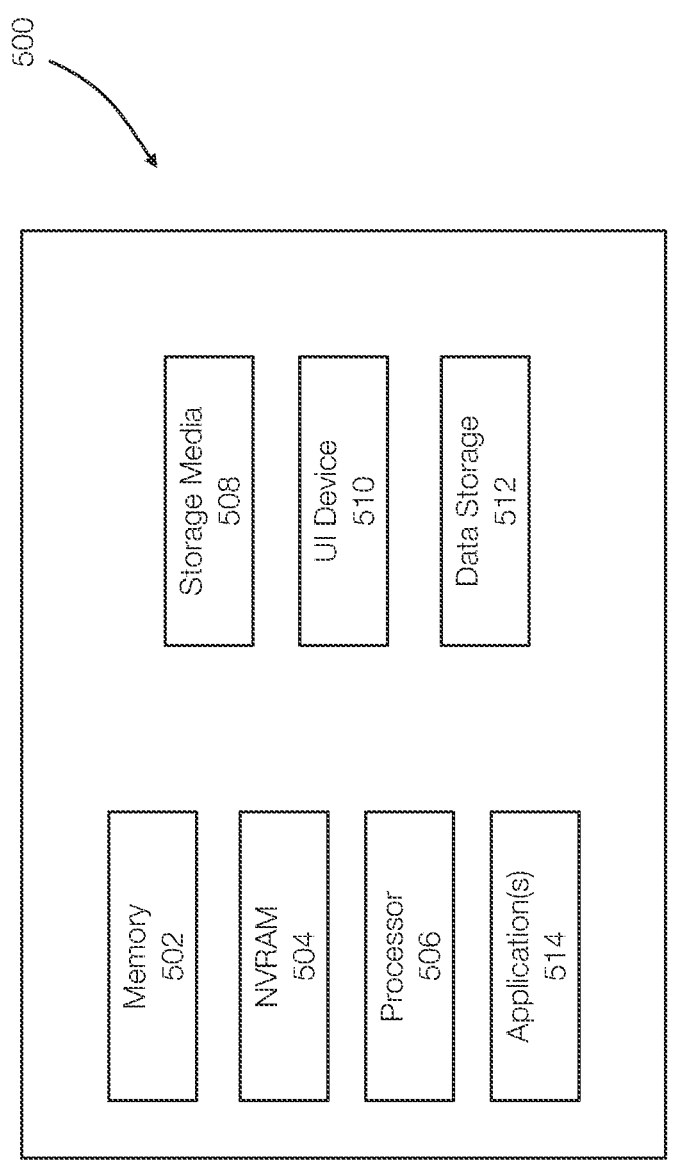
FIG. 5 discloses aspects of a computing device, system, or entity.

With reference briefly now to FIG. 5, any one or more of the entities disclosed, or implied, by the Figures, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein. The device 500 may also represent an edge computing system or a DCF computing system or computing environment and may represent a DCF system implemented at multiple geographical locations.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

ingesting data points into a data confidence fabric implemented in a computing system;

applying one or more trust insertion technologies to the data points as the data points move through the data confidence fabric;

generating a confidence score for each data point ingested into the data confidence fabric based at least in part on the one or more trust insertion technologies applied to the data points, wherein the confidence scores of the data points provide an application with a view into a trustworthiness of the data points;

aggregating the data points into aggregated data based on the confidence scores and trust insertion technologies applied to the data points, wherein the data points contribute to the aggregated data based on their corresponding confidence scores, and wherein aggregating the data points comprises anonymizing the data points; and generating aggregated results that includes the aggregated data.

2. The method of claim 1, wherein the data points are generated by data sources and wherein the data points include personal information when generated.

3. The method of claim 2, further comprising weighting each of the data points according to their confidence scores.

4. The method of claim 3, wherein data points with higher confidence scores are weighted more than data points with lower confidence scores.

5. The method of claim 4, further comprising setting a threshold confidence score, wherein data points having a confidence score lower than the threshold confidence score are not included in the aggregated data or are included with a first weight that is lower than a second weight given to data points having confidence scores higher than the threshold confidence score.

6. The method of claim 1, further comprising anonymizing the data points using differential privacy or secure multi-party computation techniques or statistical methods.

7. The method of claim 1, further comprising providing the aggregated results to an application, wherein the application is one of an analysis application, a decision making application, or a machine learning model and executing the application.

8. The method of claim 1, further comprising storing the confidence scores in a ledger.

9. The method of claim 1, further comprising associating the aggregated results with an aggregated confidence score.

10. The method of claim 9, further comprising storing the aggregated confidence score in a ledger.

11. A non-transitory storage medium having stored therein instructions that are executable by one or more hardware processors to perform operations comprising:

ingesting data points into a data confidence fabric implemented in a computing system;

applying one or more trust insertion technologies to the data points as the data points move through the data confidence fabric;

generating a confidence score for each data point ingested into the data confidence fabric based at least in part on the one or more trust insertion technologies applied to the data points, wherein the confidence scores of the data points provide an application with a view into a trustworthiness of the data points;

aggregating the data points into aggregated data based on the confidence scores and trust insertion technologies applied to the data points, wherein the data points contribute to the aggregated data based on their corresponding confidence scores, and wherein aggregating the data points comprises anonymizing the data points; and generating aggregated results that includes the aggregated data.

12. The non-transitory storage medium of claim 11, wherein the data points are generated by data sources and wherein the data points include personal information when generated.

13. The non-transitory storage medium of claim 12, further comprising weighting each of the data points according to their confidence scores.

14. The non-transitory storage medium of claim 13, wherein data points with higher confidence scores are weighted more than data points with lower confidence scores.

15. The non-transitory storage medium of claim 14, further comprising setting a threshold confidence score, wherein data points having a confidence score lower than the threshold confidence score are not included in the aggregated data or are included with a first weight that is lower than a second weight given to data points having confidence scores higher than the threshold confidence score.

16. The non-transitory storage medium of claim 11, further comprising anonymizing the data points using differential privacy or secure multi-party computation techniques or statistical methods.

17. The non-transitory storage medium of claim 11, further comprising providing the aggregated results to an application, wherein the application is one of an analysis application, a decision making application, or a machine learning model and executing the application.

18. The non-transitory storage medium of claim 11, further comprising storing the confidence scores in a ledger.

19. The non-transitory storage medium of claim 11, further comprising associating the aggregated results with an aggregated confidence score.

20. The non-transitory storage medium of claim 19, further comprising storing the aggregated confidence score in a ledger.

* * * * *